US012061906B2

(12) United States Patent
Stephens et al.

(10) Patent No.: US 12,061,906 B2
(45) Date of Patent: Aug. 13, 2024

(54) APPARATUS AND METHOD FOR PERFORMING A SPLICE OF VECTORS BASED ON LOCATION AND LENGTH DATA

(71) Applicant: ARM LIMITED, Cambridge (GB)

(72) Inventors: Nigel John Stephens, Cambridge (GB); Jacob Eapen, Waterbeach (GB); Mbou Eyole, Soham (GB)

(73) Assignee: ARM LIMITED, Cambridge (GB)

( * ) Notice: Subject to any disclaimer, the term of this patent is extended or adjusted under 35 U.S.C. 154(b) by 109 days.

(21) Appl. No.: 15/745,478

(22) PCT Filed: Jun. 15, 2016

(86) PCT No.: PCT/GB2016/051772
§ 371 (c)(1),
(2) Date: Jan. 17, 2018

(87) PCT Pub. No.: WO2017/021677
PCT Pub. Date: Feb. 9, 2017

(65) Prior Publication Data
US 2018/0210733 A1 Jul. 26, 2018

(30) Foreign Application Priority Data

Jul. 31, 2015 (GB) ...................................... 1513497

(51) Int. Cl.
*G06F 9/315* (2018.01)
*G06F 9/30* (2018.01)
(52) U.S. Cl.
CPC ...... *G06F 9/30032* (2013.01); *G06F 9/30018* (2013.01); *G06F 9/30036* (2013.01)
(58) Field of Classification Search
CPC ............. G06F 9/30018; G06F 9/30032; G06F 9/30036
See application file for complete search history.

(56) References Cited

U.S. PATENT DOCUMENTS 5,751,614 A    5/1998  Cohen
5,781,457 A *  7/1998  Cohen ..................... G06F 7/575
                                                       708/231
(Continued)

FOREIGN PATENT DOCUMENTS

CN         1926511 A     3/2007
JP      2005508043 A     3/2005
(Continued)

OTHER PUBLICATIONS

Intel, "IA-64 Application Developer's Architecture Guide", May 1999, p. 7-29.*
(Continued)

*Primary Examiner* — David J. Huisman
(74) *Attorney, Agent, or Firm* — Nixon & Vanderhye, PC

(57) ABSTRACT

An apparatus and a method are provided for performing a splice operation, the apparatus having a set of vector registers and one or more control registers. Processing circuitry is arranged to execute a sequence of instructions including a splice instruction that identifies at least a first vector register and at least one control register. The first vector register stores a first vector of data elements having a vector length, and the at least one control register stores control data identifying one or more data elements occupying sequential data element positions within the first vector of data elements. The processing circuitry is responsive to execution of the splice instruction to extract from the first vector each data element identified by the control data in the at least one control register, and to output the extracted data elements within sequential data element positions of the result vector starting from a first end of the result vector, and data elements from a second vector are output to the remaining result vector data element positions not occupied by the extracted data elements from the first vector.

20 Claims, 9 Drawing Sheets

(56) References Cited

U.S. PATENT DOCUMENTS

| | | | |
|---|---|---|---|
| 5,996,057 A | 11/1999 | Scales, III et al. | |
| 6,115,812 A * | 9/2000 | Abdallah | G06F 9/30014 708/520 |
| 6,308,253 B1 * | 10/2001 | Gadre | G06F 9/3001 707/999.101 |
| 7,350,058 B2 | 3/2008 | Carpenter | |
| 8,914,613 B2 * | 12/2014 | Sperber | G06F 9/30032 712/22 |
| 2004/0068642 A1 * | 4/2004 | Tanaka | G06F 9/30021 712/E9.02 |
| 2004/0098556 A1 * | 5/2004 | Buxton | G06F 9/3001 711/201 |
| 2004/0205325 A1 | 10/2004 | Hansen et al. | |
| 2007/0106883 A1 * | 5/2007 | Choquette | G06F 9/30036 712/225 |
| 2009/0182982 A1 * | 7/2009 | Greiner | G06F 9/30018 712/204 |
| 2012/0254589 A1 | 10/2012 | Corbal San Adrian et al. | |
| 2013/0212355 A1 | 8/2013 | Mimar | |
| 2013/0305020 A1 * | 11/2013 | Valentine | G06F 9/3001 712/208 |
| 2014/0068227 A1 * | 3/2014 | Toll | G06F 9/30018 712/200 |
| 2014/0281372 A1 | 9/2014 | Ingle et al. | |

FOREIGN PATENT DOCUMENTS

| | | |
|---|---|---|
| JP | 2007528545 A | 10/2007 |
| KR | 10-2015-0047547 | 5/2015 |
| TW | 201243715 A | 11/2012 |
| TW | 201301032 A | 1/2013 |
| WO | WO 2005/088441 | 9/2005 |
| WO | WO 2005/088441 A2 | 9/2005 |
| WO | WO 2006/106342 | 10/2006 |
| WO | WO 2013/095510 | 6/2013 |
| WO | WO 2014/031129 | 2/2014 |

OTHER PUBLICATIONS

Bocchino et al., "Vector LLVA: A Virtual Vector Instruction Set for Media Processing", 2006, 11 pages.*
Yu, "Vector Processing as a Soft-CPU Accelerator", 2008, 127 pages.*
International Search Report and Written Opinion of the ISA for PCT/GB2016/051772, mailed Aug. 2, 2016, 15 pages.
Search and Examination Report for GB1513497.6, dated Feb. 16, 2016, 9 pages.
Anonymous, "RMU Mask Generation From Shift Amounto of Pad/Start/End Specifications", IBM Technical Disclosure Bulletin, vol. 32, No. 5B, Oct. 1, 1989, pp. 197-204.
UK Examination Report issued Jan. 31, 2018 in GB 1513497.6, 3 pages.
Office Action in corresponding European Application No. 16 731 266.9 dated Sep. 9, 2019, (7 pages).
Office Action in corresponding European Application No. 16 731 266.9-1203 dated Sep. 9, 2020.
Office Action in corresponding Japanese Application No. 2018-503761 dated Sep. 1, 2020.
Office Action in related Indian Application No. 201817006414 dated Feb. 22, 2021, 6 pages.
Office Action in corresponding Taiwan Application No. 105124012 dated Jun. 4, 2020 with translation (11 pages).
Office Action for National Intellectual Property Administration, PRC for Application No. 201680043378.7 dated Jul. 26, 2021, with English language translation, 33 pages.
Japanese Office Action for Application No. 2018503761 dated Jun. 1, 2021 with English translation, 5 pages.
Korean Office Action for Application No. 10-2018-7004344 dated Dec. 6, 2022 with English language translation, 80 pages.

* cited by examiner

PREDICATE REGISTER (Psp)

TWO SOURCE REGISTERS

PREDICATE REG / SOURCE REG COMBINATION

OR

APPARATUS AND METHOD FOR PERFORMING A SPLICE OF VECTORS BASED ON LOCATION AND LENGTH DATA

This application is the U.S. national phase of International Application No. PCT/GB2016/051772 filed 15 Jun. 2016, which designated the U.S. and claims priority to GB Patent Application No. 1513497.6 filed 31 Jul. 2015, the entire contents of each of which are hereby incorporated by reference.

The present technique relates to an apparatus and method for performing a splice operation.

It is useful in modern data processing systems to be able to perform a splice operation in order to extract a certain number of consecutive data elements within a first vector, and then output those extracted data elements within a result vector along with data elements from a second vector. It would be desirable to provide an efficient and flexible way of performing such splice operations.

In a first example configuration, there is provided an apparatus, comprising: a set of vector registers, one or more control registers; and processing circuitry to execute a sequence of instructions including a splice instruction identifying at least a first vector register and at least one control register, the first vector register storing a first vector of data elements having a vector length, and the at least one control register storing control data identifying, independently of the vector length, one or more data elements: the one or more data elements comprising one of: one data element within the first vector of data elements, or a plurality of data elements occupying sequential data element positions within the first vector of data elements, wherein the control data comprises location data identifying a location of a first data element within the first vector register and length data, different from the location data, identifying a number of data elements to extract from the first vector of data elements; the processing circuitry being responsive to execution of the splice instruction to extract from the first vector each data element identified by the control data in the at least one control register and to output each extracted data element within a result vector of data elements that also contains data elements from a second vector of data elements.

In a further example configuration there is provided a method of performing a splice operation within an apparatus having a set of vector registers, and one or more control registers, the method comprising: executing a splice instniction identifying at least a first vector register and at least one control register, the first vector register storing a first vector of data elements having a vector length, and the at least one control register storing control data identifying, independently of the vector length, one or more data elements; the one or more data elements comprising one of: one data element within the first vector of data elements, or a plurality of data elements occupying sequential data element positions within the first vector of data elements, wherein the control data comprises location data identifying a location of a first data element within the first vector register and length data, different from the location data, identifying a number of data elements to extract from the first vector of data elements; said executing of the splice instruction comprising: extracting from the first vector each data element identified by the control data in the at least one control register; and outputting each extracted data element within a result vector of data elements that also contains data elements from a second vector of data elements In a yet further example configuration, there is provided an apparatus, comprising: a set of vector register means; one or more control register means; processing means for executing a sequence of instructions including a splice instruction identifying at least a first vector register means and at least one control register means, the first vector register means for storing a first vector of data elements having a vector length, and the at least one control register means for storing control data identifying, independently of the vector length, one or more data elements; the one or more data elements comprising one of: one data element within the first vector of data elements, or a plurality of data elements occupying sequential data element positions within the first vector of data elements, wherein the control data comprises location data identifying a location of a first data element within the first vector register and length data, different from the location data, identifying a number of data elements to extract from the first vector of data elements; the processing means, responsive to execution of the splice instruction, for extracting from the first vector each data element identified by the control data in the at least one control register means, and for outputting each extracted data element within a result vector of data elements that also contains data elements from a second vector of data elements.

In an alternative configuration there is provided a computer program stored on a non-transitory computer readable storage medium that, when executed by a data processing apparatus, provides a virtual machine which provides an instruction execution environment corresponding to the apparatus of the above-mentioned first example configuration.

The present technique will be described further, by way of example only, with reference to embodiments thereof as illustrated in the accompanying drawings, in which:

FIG. 1 is a block diagram of an apparatus in accordance with one embodiment;

FIGS. 2 to 4 schematically illustrate operations performed by splice instructions in accordance with example embodiments;

Figure 9A:
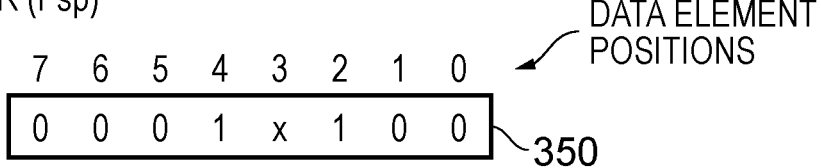
Figure 9B:
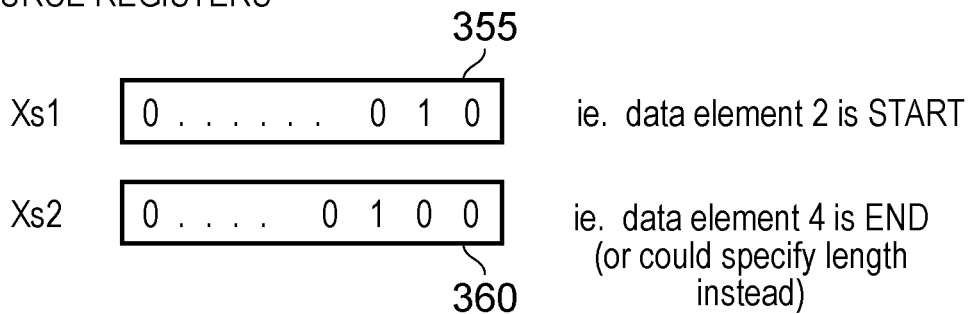
Figure 9C:
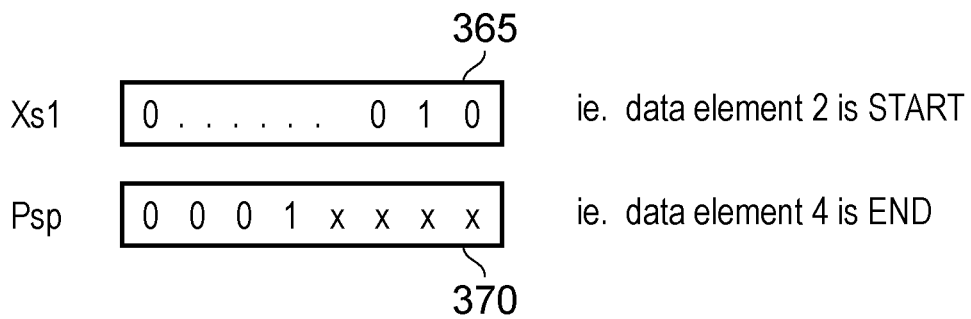
Figure 9D:
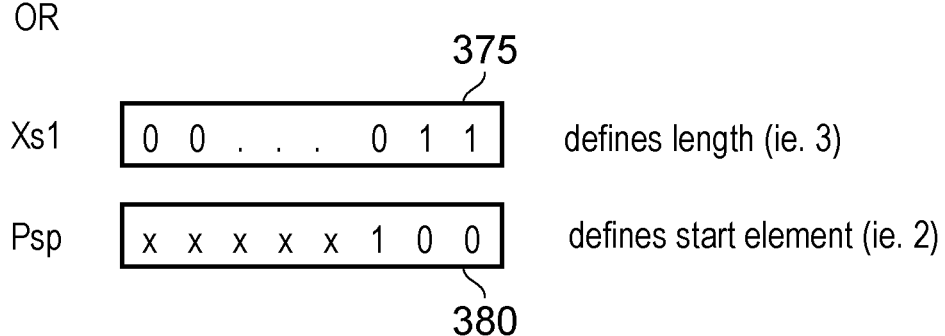
Figure 10:
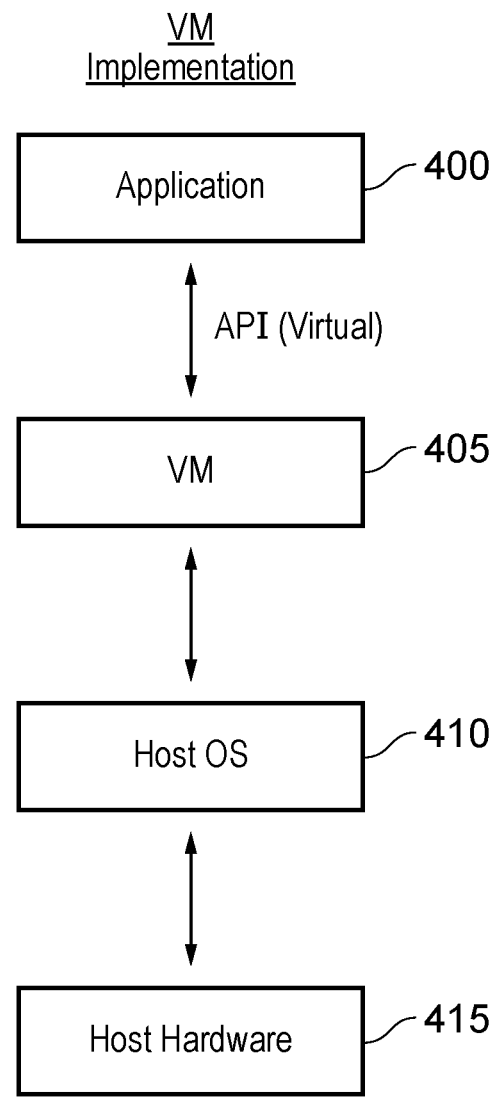

FIGS. 9A to 9D illustrate example arrangements of control registers that may be specified by the splice instruction in order to identify, independently of the vector length, the data elements occupying sequential data element positions that are to be extracted from a first vector of data elements, in accordance with various different embodiments; and FIG. 10 illustrates a virtual machine implementation that may be employed in one embodiment.

Before discussing the embodiments with reference to the accompanying figures, the following description of embodiments is provided.

In one embodiment an apparatus is provided that has a set of vector registers and one or more control registers. Processing circuitry within the apparatus is arranged to execute a sequence of instructions, that sequence including a splice instruction that identifies at least a first vector register and at least one control register. The first vector register stores a first vector of data elements having a vector length, and the at least one control register stores control data that identifies, independently of the vector length, one or more data elements occupying sequential data element positions within the first vector of data elements. When executing the splice instruction, the processing circuitry extracts from the first vector each data element identified by the control data in the at least one control register, and then outputs the extracted data elements within a result vector of data elements that also contains data elements from a second vector. The second vector may be predetermined, or may be specified by the splice instruction.

Herein the phrase "active data elements" will also be used to refer to the data elements identified by the control data as being the data elements to extract from the first vector.

Since the control data in the at least one control register identifies the active data elements without reference to the vector length, this provides a great deal of flexibility as to how the active data elements may be selected within the first vector. In particular, an arbitrary sequence of active data elements occupying sequential data element positions within the first vector may be chosen when performing the splice operation defined by the splice instruction.

By such an approach, the bounds of the active data elements can be specified without relying on any knowledge of the vector length. As a result, the splice instruction can be used within various different apparatuses, even if one such apparatus operates on vectors having a different length to the vectors operated on by another apparatus. As a result, it can be seen that the splice instruction of the above described embodiment is vector length agnostic, and hence allows a programmer to use such a spice instruction to splice together portions from first and second vectors in a vector length agnostic way.

In one embodiment the size of the data elements may be implicit. However, in an alternative embodiment such information can be encoded within the splice instruction, and hence purely by way of example may identify the data element size as being 8, 16, 32 or 64 bits.

In one embodiment, the processing circuitry is arranged to output the extracted data elements within sequential data element positions of the result vector starting from a first end of the result vector. In such an arrangement, the data elements from the second vector will then occupy the remaining data element positions not occupied by the extracted data elements from the first vector.

In one embodiment, the splice instruction further identifies a second vector register storing the second vector of data elements. The processing circuitry is then responsive to execution of the splice instruction to include, at each data element position in the result vector unoccupied by the extracted data elements, a data element from the second vector of data elements.

The data elements from the second vector that are chosen for inclusion within the result vector may be selected in a variety of ways. However, in one embodiment the processing circuitry is arranged to include within the result vector sequential data elements starting from a first end of the second vector of data elements.

The one or more control registers within the apparatus can take a variety of forms, but in one embodiment comprise at least one predicate register, with each predicate register used to store predicate data for each data element position within a vector of data elements. The predicate data within a predicate register hence specifies a vector of Boolean (i.e. true/false) conditions, with each data element within an associated vector of data elements being associated with one of those Boolean conditions. Whilst in one embodiment there may be a 1:1 relationship between the number of items of predicate conditions within the predicate data and the number of data elements in an associated vector controlled by that predicate data, this is not essential, and in alternative embodiments a single item of predicate data may provide a condition which is applied to multiple data elements. Further, whilst in one embodiment each predicate item within the predicate data takes the form of a single bit, there is no requirement for each predicate item to be specified by only a single bit.

In such an embodiment where the control registers include at least one predicate register, the at least one control register identified in the splice instruction may comprise one such predicate register, with the processing circuitry being responsive to the execution of the splice instruction to determine from the predicate data each data element to be extracted from the first vector.

By using such a predicate register, it is possible to specify each active data element using only a single register. This hence provides a particularly efficient encoding for identifying the active data elements. It is also often the case that there are less predicate registers provided within the system than scalar registers (that could alternatively be used to specify the control data to identify the active data elements), which further improves the encoding efficiency within the instruction, since less bits within the instruction are required to identify the predicate register. In addition, due to the nature of the predicate data, it can be ensured that the identified active data elements can never span the end of the vector, hence automatically avoiding the need to check for conditions such as an out of range index.

The predicate data can be arranged in a variety of ways, but in one embodiment provides location and length information used to determine the data elements to be extracted from the first vector of data elements. Due to the flexible way in which the active data elements can be specified using predicate data, it is possible to identify the start location of the active data elements as being any data element position within the vector register, and further the number of active data elements can be any desired number within the vector.

Herein, the sequence of active data elements identified when performing the splice operation will be referred to as a splice segment. By controlling the splice operation using a predicate specified by the splice instruction, the splice instruction can be used in vector length agnostic code, whilst ensuring that the splice segment can never span the end of the vector.

There are a number of ways in which the location and length information can be specified by the predicate data. In one embodiment the predicate data identifies a first extraction data element position and a last extraction data element position, and the processing circuitry determines, as the data elements to be extracted, a sequence of data elements between the first extraction data element position and the last extraction data element position. Considering an example embodiment where each predicate item within the predicate data is a single bit, then the first extraction data element position may be identified by the first predicate bit that is set to a first value (for example a logic 1 value) and the last extraction data element position may be identified by the last predicate bit that is set to that first value. The value of any intervening predicate bits can be ignored.

Whilst in one embodiment the control data required to identify the active data elements during execution of the splice instruction may be specified with reference to a predicate register, in an alternative embodiment different control registers may be used. In particular, in one embodiment the one or more control registers may comprise one or more scalar registers for storing data values. In such an embodiment, the at least one control register identified in the splice instruction may comprise at least one scalar register, the processing circuitry being responsive to execution of the splice instruction to use the data value in each identified scalar register when determining each data element to be extracted from the first vector.

There are a number of ways in which such scalar registers can be used to provide the required control data. In one embodiment, the splice instruction identifies first and second scalar registers whose stored data values provide location and length information used to determine the one or more data elements to be extracted from the first vector of data elements.

For example, in one embodiment the stored data values in the first and second scalar registers identify a first extraction data element position and a last extraction data element position, and the processing circuitry determines, as the data elements to be extracted, a sequence of data elements between the first extraction data element position and the last extraction data element position. In an alternative embodiment, one of the scalar registers may be used to identify the start location, and the other scalar register may provide a scalar value identifying the number of data elements to be included as active data elements starting from that location.

In a yet further alternative embodiment, the at least one control register identified in the splice instruction may comprise both a predicate register and a scalar register, with the data value in the identified scalar register being used in combination with the predicate data in the identified predicate register to determine the one or more data elements to be extracted from the first vector of data elements. For example, either the scalar register or the predicate register may be used to identify a start location, with the other register then being used to either indicate an end location, or to provide length information indicative of the number of active data elements to be included starting from the identified start location.

In embodiments where the splice instruction specifies both a first vector register and a second vector register, then it is possible in one embodiment for both the first vector register and the second vector register to be identified as being the same vector register. By such an approach, it is possible to employ the splice instruction to perform a rotation operation in order to alter the order in which the data elements appear within the vector.

In one embodiment, the first vector register specified by the splice instruction (and indeed the second vector register if specified) may itself be a predicate register used to store predicate data for each data element positioned within a vector of data elements. Accordingly, such splice instructions may not only be used to operate on vector operands of data elements, but also to operate on predicate vectors, where the control data identified by the specified control register (which itself may be a predicate register) identifies the splicing to be performed in respect of items of predicate data within the specified predicate vector(s). In one such embodiment where the first vector register identified by the splice instruction is itself a predicate register, then each data element within the first vector register may comprise a single bit, that single bit representing one item of predicate data.

In one example use case, the processing circuitry may be arranged to execute the splice instruction in each of a plurality of iterations, in each iteration control data in the at least one control register identified by the splice instruction identifying one or more data elements to be extracted from the first vector of data elements that differs to the one or more data elements identified for extraction during a preceding iteration. By such an approach, it is possible to use a series of splice instructions to efficiently implement a sliding window operation on specified vector operands.

The processing circuitry used to execute the splice instruction may take a variety of forms, but in one embodiment comprises vector permute circuitry.

The vector permute circuitry can take a variety of forms, but in one embodiment comprises first shift circuitry to perform a first shift operation on the first vector of data elements and second shift circuitry to perform a second shift operation on the second vector of data elements, and combination circuitry to generate the result vector from the vectors output by the first and second shift circuitry. In addition analysis circuitry is used to analyse the control data in the at least one control register in order to determine the one or more data elements to be extracted from the first vector of data elements, and to issue control signals to control the operation of the first and second shift circuitry in dependence on that analysis. Hence, the operation of the first and second shift circuits can be controlled in dependence on the control data provided by the specified control register(s) so as to perform suitable shift operations on the first and second vectors in order to create modified vectors that can then be combined by the combination circuitry. In one embodiment, the shift performed on the first vector will be in an opposite direction to the shift performed on the second vector.

The combination circuitry can take a variety of forms, but in one embodiment is arranged to perform a logical OR operation on two provided input vectors that are derived from the outputs of the first and second shift circuits.

In one embodiment, the vector permute circuitry further comprises first mask circuitry to perform a first mask operation on the vector output by the first shift circuitry in order to produce a first masked vector, and second mask circuitry to perform a second mask operation on the vector output by the second shift circuitry in order to produce a second masked vector, and the combination circuitry is arranged to generate the result vector by combining the first and second masked vectors.

Hence, it can be seen that in one embodiment the required operations to implement the splice operation defined by the splice instruction can be readily performed using shift and OR operations (optionally with additional masking operations as required), and the shift operations can be performed in parallel.

However, it is not necessary to construct the vector permute circuitry in such a way, and indeed various other configurations may be provided for the vector permute circuitry. In one example arrangement, the vector permute circuitry may comprise programmable crossbar circuitry to generate the result vector from the first vector of data elements and the second vector of data elements, and analysis circuitry to analyse the at least one control register in order to determine the one or more data elements to be extracted from the first vector of data elements, and to issue control signals to control the operation of the programmable crossbar circuitry in dependence on that analysis. Accordingly, in such an embodiment, the crossbar circuitry can be configured as required under the control of the analysis circuitry so as to perform the required splicing of the identified active data elements from the first vector with the required number of data elements from the second vector. In some embodiments, it may be possible to reuse crossbar circuitry already provided within the apparatus for other purposes.

Particular embodiments will now be described with reference to the Figures.

Figure 1:
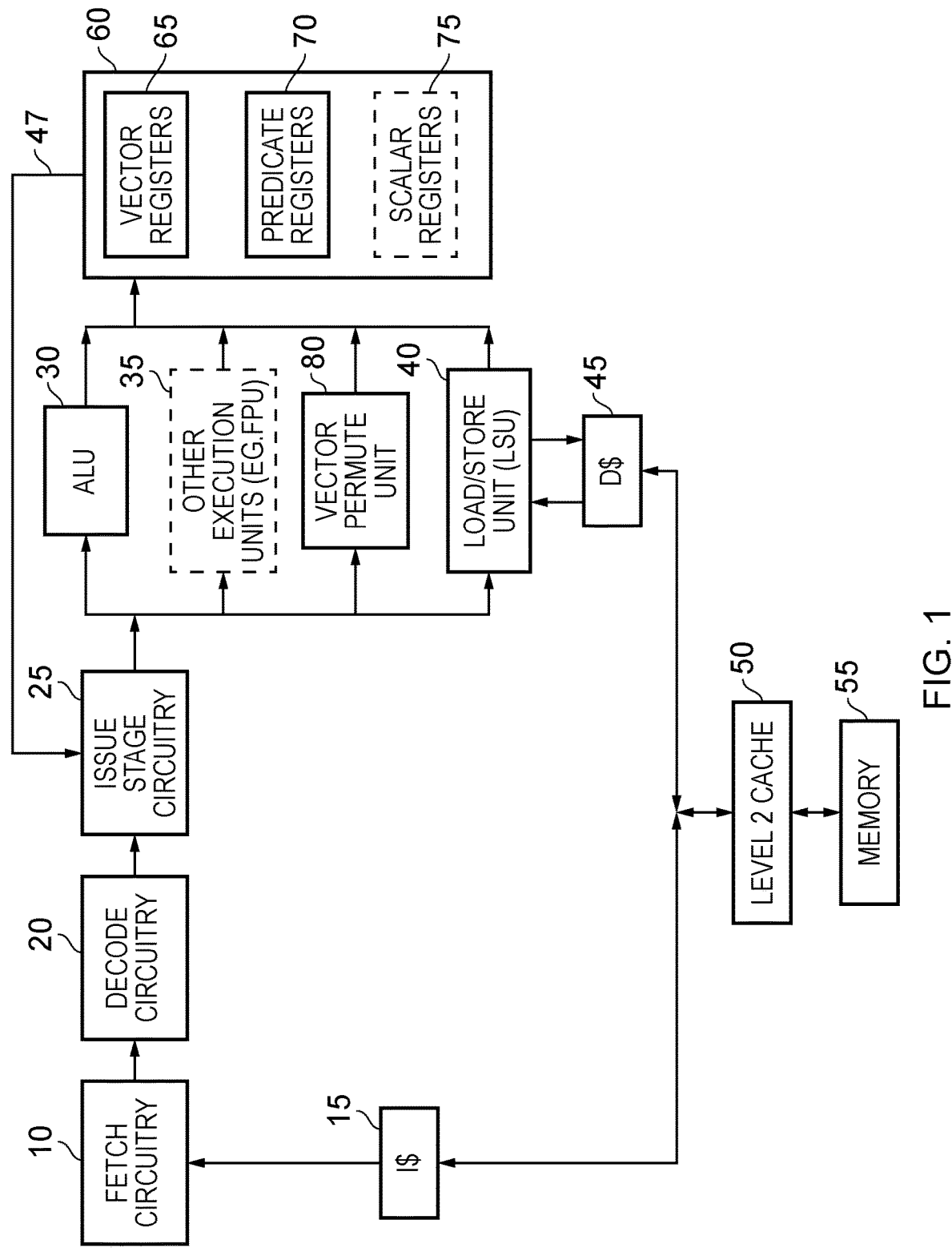

FIG. 1 is a block diagram of a system in which the techniques of the described embodiments may be employed. In the example shown in FIG. 1, the system takes the form of a pipelined processor. Instructions are fetched from an instruction cache 15 (which is typically coupled to memory 55 via one or more further levels of cache such as the level 2 cache 50) by the fetch circuitry 10, from where they are passed through decode circuitry 20 which decodes each instruction in order to produce appropriate control signals for controlling downstream execution resources within the pipelined processor to perform the operations required by the instructions. The control signals forming the decoded instructions are passed to issue stage circuitry 25 for issuing to one or more execution pipelines 30, 35, 40, 80 within the pipelined processor.

The issue stage circuitry 25 has access to the registers 60 in which data values required by the operations can be stored. In particular source operands for vector operations may be stored within the vector registers 65, and source operands for scalar operations may be stored in the scalar registers 75. In addition, one or more predicates may be stored in the predicate registers 70, for use as control information for the data elements of vector operands processed when performing certain vector operations. Furthermore, as will be discussed for example later with reference to FIGS. 9A to 9D, one or more of the scalar registers may also be used to store data values used to derive such control information for use during performance of certain vector operations.

The source operands and any associated control information can be routed via a path 47 into the issue stage circuitry, so that they can be dispatched to the appropriate execution unit along with the control signals identifying the operation(s) to be performed to implement each decoded instruction. The various execution units 30, 35, 40, 80 shown in FIG. 1 are assumed to be vector processing units for operating on vector operands, but separate execution units (not shown) can be provided if desired to handle any scalar operations supported by the apparatus.

Considering the various vector operations, arithmetic operations may for example be forwarded to the arithmetic logic unit (ALU) 30 along with the required source operands (and any control information such as a predicate), in order to enable an arithmetic logic operation to be performed on those source operands, with the result value typically being output as a destination operand for storing in a specified register of the vector register bank 65.

In addition to the ALU 30, other execution units 35 may be provided, for example a floating point unit (FPU) for performing floating point operations in response to decoded floating point instructions, and a vector permute unit 80 for performing certain permutation operations on vector operands. In addition, a load/store unit (LSU) 40 is used for performing load operations in order to load data values from the memory 55 (via the data cache 45 and any intervening further levels of cache such as level 2 cache 50) into specified registers within the register sets 60, and for performing store operations in order to store data values from those registers back to the memory 55.

The system shown in FIG. 1 may be an in-order processing system where a sequence of instructions are executed in program order, or alternatively may be an out-of-order system, allowing the order in which the various instructions are executed to be reordered with the aim of seeking to improve performance. As will be understood by those skilled in the art, in an out of order system, additional structures (not explicitly shown in FIG. 1) will be provided, for example register renaming circuitry to map the architectural registers specified by the instructions to physical registers from a pool of physical registers within the register bank 45 (the pool of physical registers typically being larger than the number of architectural registers), thereby enabling certain hazards to be removed, facilitating more use of out of order processing. In addition, a reorder buffer will typically be provided to keep track of the out of order execution, and to allow the results of the execution of the various instructions to be committed in the original program order.

In the described embodiments, the circuitry of FIG. 1 is arranged to execute vector operations on vector operands stored in the vector registers 65, where a vector operand comprises a plurality of data elements. For certain vector operations performed on such a vector operand (such as arithmetic operations), the required operation may be applied in parallel (or iteratively) to the various data elements within the vector operand. Predicate information may be used to identify which data elements within a vector are active data elements for a particular vector operation, and hence are data elements to which the operation should be applied.

In one embodiment, the sequence of instructions executed by the circuitry of FIG. 1 may include at least one splice instruction. Each splice instruction will identify at least a first vector register within the vector register bank 65 and at least one control register. The control register may take the form of one of the predicate registers 70, or as will be discussed later may instead be specified by one or more of the scalar registers 75, or by a combination of a predicate register and a scalar register. When such a splice instruction is decoded by the decode circuitry 20, the issue stage circuitry 25 will subsequently issue appropriate control signals to the vector permute unit 80 to cause the required operations to be performed in order to implement the splice operation required by that splice instruction. In particular, the control data specified by the at least one control register is used to identify one or more active data elements occupying sequential data element positions within a first vector of data elements specified by the splice instruction. The control data is organised in such a way that it identifies the active data elements independently of the vector length and hence those active data elements can be identified without reference to the vector length. Having identified the active data elements within the first vector, the vector permute unit then extracts those active data elements from the first vector and outputs them within a result vector, with the remaining data element positions in the result vector being filled with data elements from a second vector. The second vector may be predetermined, or may alternatively be specified by the splice instruction.

Figure 2:
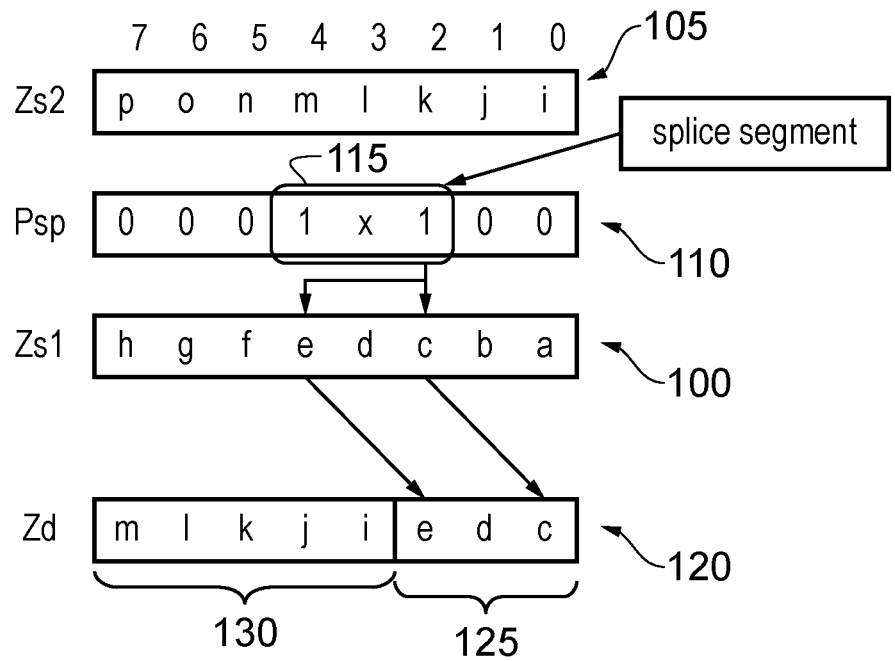

FIG. 2 illustrates an example form of the splice instruction and the resulting operation performed. In particular, the splice instruction specifies two vector source registers 100, 105 from within the vector register bank 65, and also specifies a predicate register 110 from within the predicate registers 70. This predicate register is referred to as the Psp register to denote that the contents of that predicate register contains splice control data. An example form of the predicate data is shown in FIG. 2. In particular, in this embodiment the first and last occurrence of a logic 1 value within the predicate data is used to identify the splice segment 115.

In one embodiment, the intervening predicate values between those two logic one values is not important and can be either logic 1 or logic 0 values.

The first and last logic 1 values can hence be seen as identifying first and last active data element positions within the associated first source vector 100. Hence, in this example, numbering the data element positions from the right hand side it can be seen that the particular example of a predicate within the predicate register 110 of FIG. 2 identifies data element positions 2 and 4 as being the data element positions of the first and last active data elements. Accordingly, the vector permute unit will extract the data elements from positions 2, 3 and 4 of the first vector 100, and output them at a predetermined location within the specified destination vector register 120. In this embodiment, it is assumed that the extracted values are used to occupy the data element positions 125 starting from the least significant data element position in the destination vector 120, but it will be appreciated that they can alternatively occupy different positions, for example a certain number of most significant bit positions within the destination vector, in an alternative embodiment. The remaining data element positions 130 within the destination register 120 are then filled by the vector permute unit with the data elements from the second source vector register 105, starting with data element position 0 in the second source vector register. As hence shown in FIG. 2, the output result vector 120 from the vector permute unit 80 takes the form "mlkjiedc".

From a review of FIG. 2, it will be seen that the location and length information required to identify the active data elements is specified independently of the vector length, and accordingly can be determined from the predicate without needing to have knowledge of the vector length. Splicing can be performed from any location in the source vector register and with any length, and in particular does not need to be justified to one end of the vector.

In one embodiment the number of data elements in each vector and the size of the data elements may be implicit. However, in an alternative embodiment such information can be encoded within the instructions. For example, the instruction encoding could include information identifying the data element size (e.g. 8, 16, 32 or 64 bits), with the vector length then being determined from the number of data elements in each vector register referred to in the instruction and the specified data element size.

Further, in the example of FIG. 2 the boundary case of out of range index condition is automatically handled since the predicate register and the source vector register have the same number of elements, and hence in this form the instruction cannot raise an out of range index exception.

Furthermore, such a splice instruction can be used in generic library code, since the predicate can be constructed dynamically based on the number of accessible data elements, or as required by the programmer or algorithm. With the predicate thus specified, the splice instruction can be used to extract and concatenate portions of different vector registers in a vector length agnostic fashion, with the location and length of the two portions being controlled by the predicate data in the specified predicate register.

Figure 3:
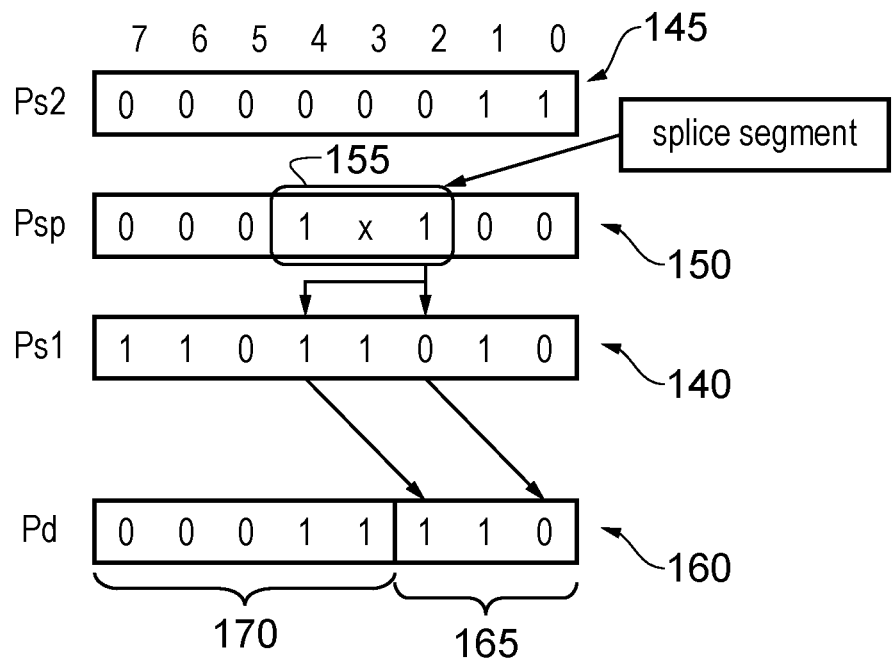

Whilst in the example of FIG. 2, the first and second source vectors contain vectors of data elements held within the vector registers 65, in an alternative embodiment those first and second vector registers may actually specify predicate registers within the predicate register set 70, as illustrated schematically in FIG. 3. In this example, each of the source vectors represents a vector of predicate items, as shown by the two source predicate registers 140, 145. The splice predicate register 150 then, as before, provides a predicate that is used to identify the splice segment 155 identifying the active data elements within the first source register 140. As a result, those identified active data elements (in this example each data element being a single bit value) are output in the portion 165 of the destination predicate register 160, with the remaining portion 170 being filled with the data elements from the second source register 145, starting with data element position 0 of the second source register.

Figure 4:
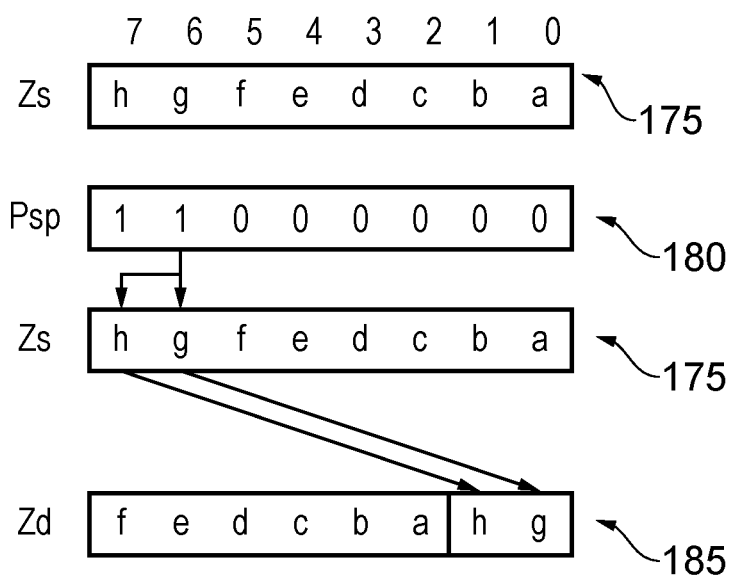

As also shown in FIG. 4, the splice instruction can be used to perform a rotation, by specifying the same register 175 as both the first vector register and the second vector register. In this example, the splice predicate 180 identifies a splice segment containing a certain number of most significant data element positions within the source register 175. These data elements are hence moved to the lowest significant data element positions in the result register 185, with the remaining data element positions being filled by the contents of the source register, starting from the least significant data element position.

Figure 5:
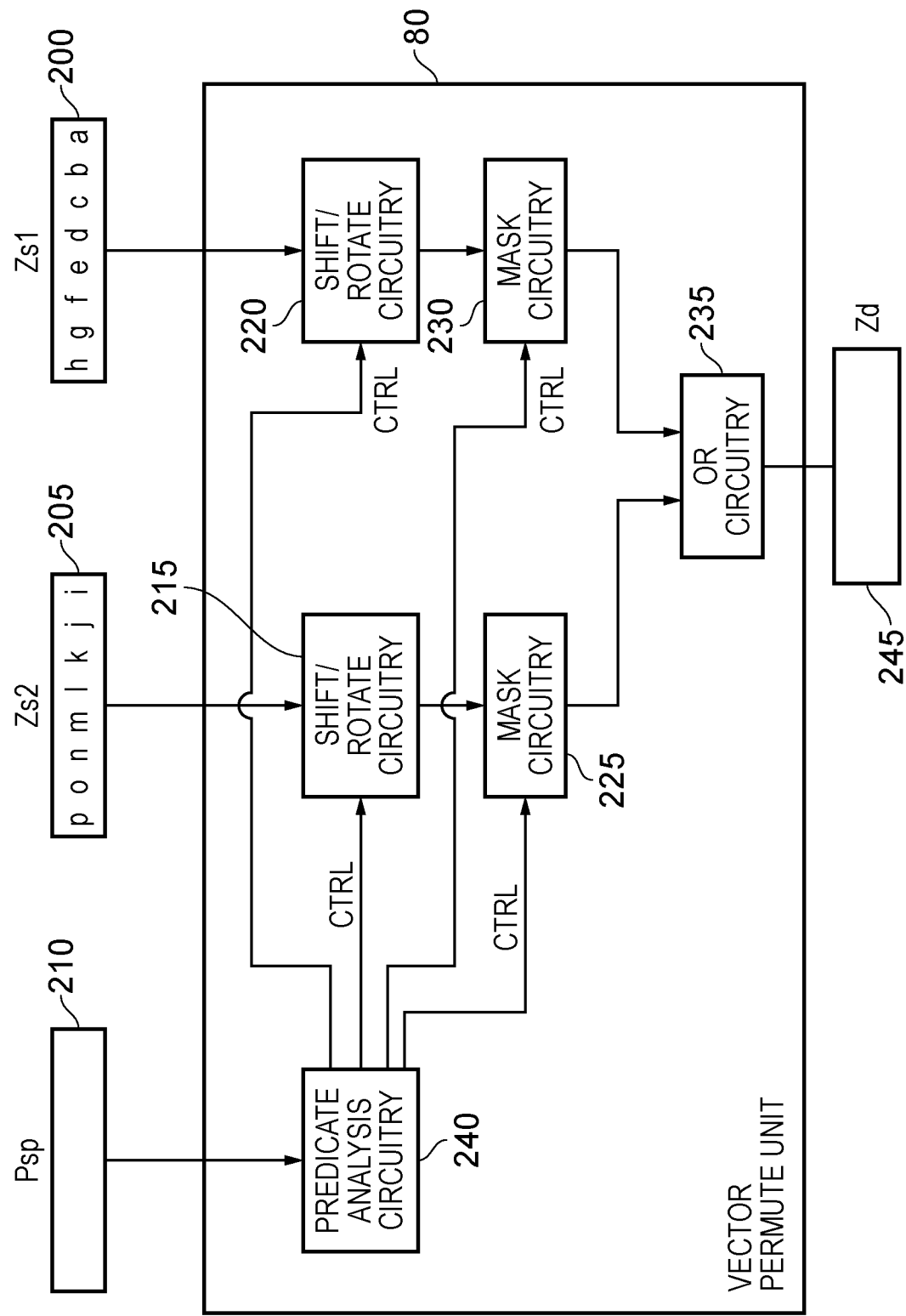
FIG. 5 is a diagram illustrating the vector permute unit of FIG. 1 in accordance with one embodiment.

The vector permute unit 80 used to perform the above described splice operation during execution of the splice instruction can take a variety of forms. One example arrangement is shown in FIG. 5, where the vector permute unit includes two shift/rotate circuit blocks 215, 220, each associated with one of the vector source registers 200, 205, associated mask circuits 225, 230, and combination circuitry 235 to combine the outputs from the two mask circuits, in this example the combination circuitry taking the form of a logical OR circuit 235. The output form the OR circuitry 235 is then stored in the destination register 245. The vector permute unit 80 also includes predicate analysis circuitry 240 which receives the predicate data specified by the splice predicate register 210. In particular, the predicate data is analysed in order to identify the splice segment, and this is used to produce appropriate control signals for the shift/rotate circuit 220. In particular, the shift/rotate circuitry 220 is caused to perform a right shift sufficient to move the active data elements identified by the splice segment into a number of data element positions starting from the least significant data element position. Conversely, the shift/rotate circuitry 215 is arranged to perform a left shift sufficient to move a certain number of the least significant data elements in the second source register into the remaining data element positions for the result vector.

The predicate analysis circuitry 240 also produces control signals for the two mask circuits 225, 230, in order to ensure that any non-required data elements in the outputs from the two shift/rotate circuits 250, 220 are set to a predetermined value, for example all zeros in the embodiment shown in FIG. 5 where the combination circuitry takes the form of OR circuitry 235. The OR circuitry then performs a logical OR operation on the outputs of the mask circuits in order to generate the result vector to be stored in the result vector register 245.

Figure 6:
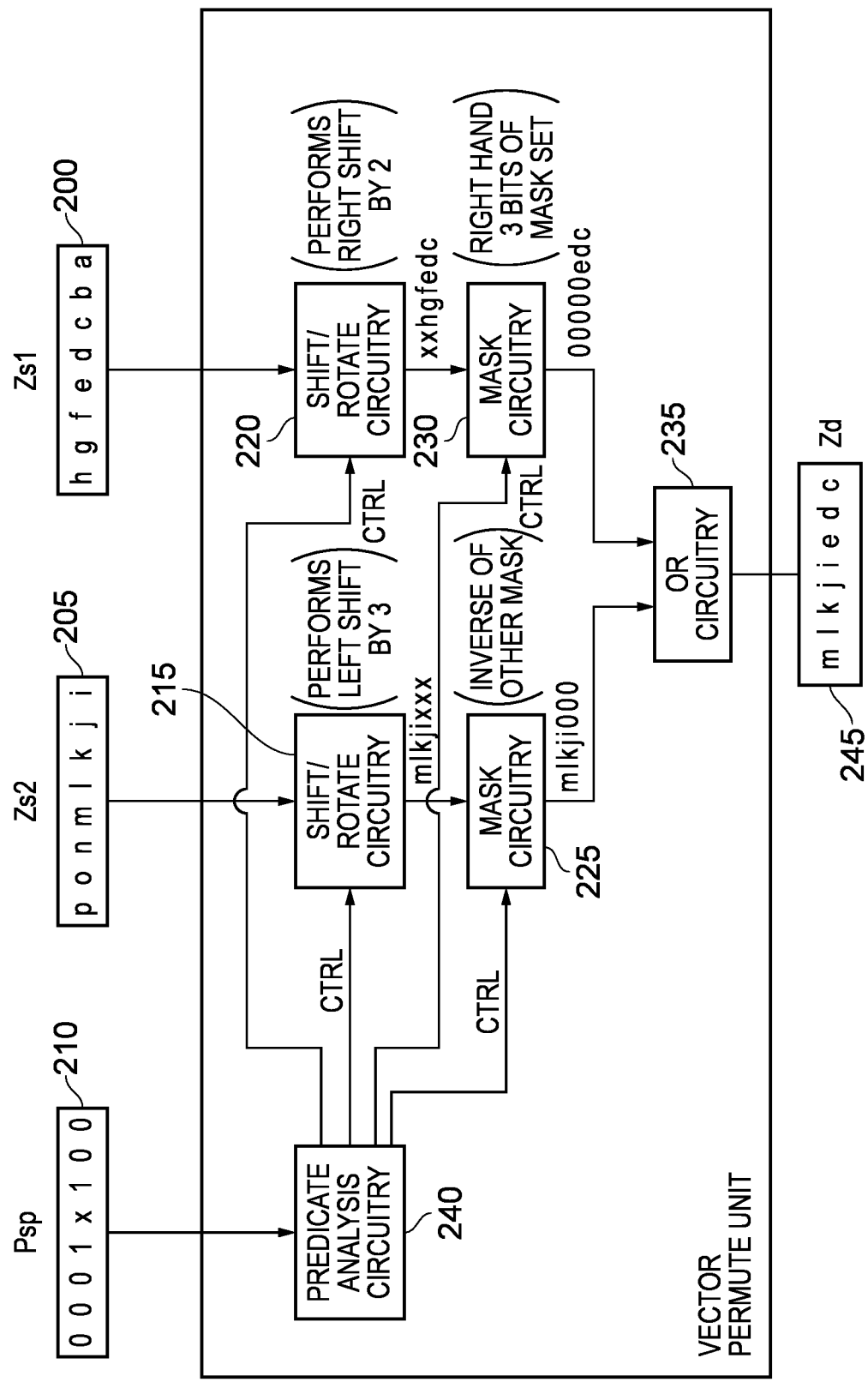
FIG. 6 is a diagram illustrating how the vector permute unit of FIG. 5 is used to perform the operation outlined in FIG. 2, in accordance with one embodiment.

FIG. 6 illustrates how the circuitry of FIG. 5 is used to perform the operation discussed earlier with reference to FIG. 2. In particular, the predicate analysis circuitry 240 causes the shift/rotate circuitry 220 to perform a right shift by two data element positions, this being determined based on the number of leading zeros in the predicate specified by the splice predicate register 210. Conversely, the shift/rotate circuitry 215 performs a left shift by three, determined based on the length of the splice segment in the predicate. The outputs from both shift/rotate circuits 215, 220 is shown in FIG. 6. The letter "x" indicates a "don't care" state for the data elements at those data element positions. In particular, irrespective of the values of those data elements, those data element values will be masked by the associated mask circuits 225, 230.

The predicate analysis circuitry 240 sends a control signal to the mask circuitry 230 to cause the right hand three bits of the mask to be set, hence causing the data elements "edc" to be output from the mask circuitry, with all of the other data elements being set to logic 0 values. It should be noted that the zero values indicated at the output of the mask circuitry in FIG. 6 are not single bit values, but each zero indicates an all zeros value for the corresponding data element, which typically may be more than a single bit. For example, in one embodiment each data element within the vector is one byte in length. The control signal presented to the mask circuitry 230 is determined from the size of the splice segment determined by the predicate analysis circuitry 240 from the predicate data in the predicate register 210, in this example the splice segment having a length of three data elements.

Having generated the mask control signal for the mask circuitry 230, the predicate analysis circuitry then generates an appropriate control signal for the mask circuitry 225, such that the mask implemented by the mask circuitry 225 is the inverse of the mask applied by the mask circuitry 230. As a result, the output from the mask circuitry 225 is as shown in FIG. 6. The OR circuitry 235 then performs a logic OR operation on the two input vectors in order to produce the output vector "mlkjiedc" shown within the destination register 245 of FIG. 6.

Figure 7:
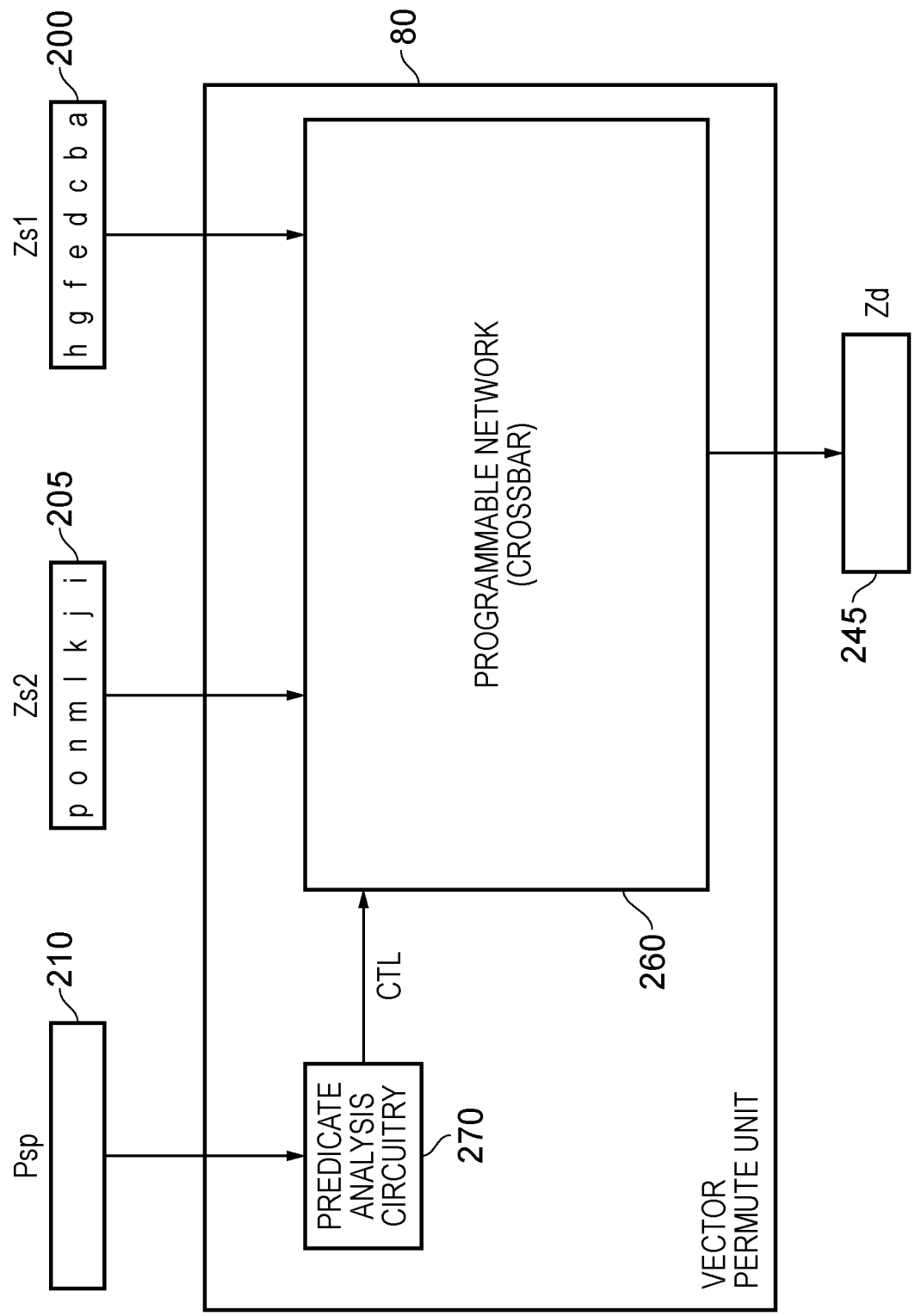
FIG. 7 is a diagram illustrating the vector permute unit of FIG. 1 in accordance with an alternative embodiment.

It will be appreciated from the above description that the required vector permute circuitry can be constructed efficiently using shift, mask and OR circuit blocks, and the shift operations can be performed in parallel (as indeed can the mask operations). However, the vector permute unit can instead take a number of alternative forms. One particular example is shown in FIG. 7 where the vector permute unit 80 includes a programmable network, also referred to as a crossbar 260, whose operation is controlled by the predicate analysis circuitry 270 based on an analysis of the predicate data provided by the predicate register 210. Based on an identification of the splice segment identified by the predicate data, the predicate analysis circuitry 270 can then configure the programmable crossbar so that the appropriate data elements from both source registers 200, 205 are provided to the required output data element positions within the result vector stored in the result vector register 245.

Figure 8:
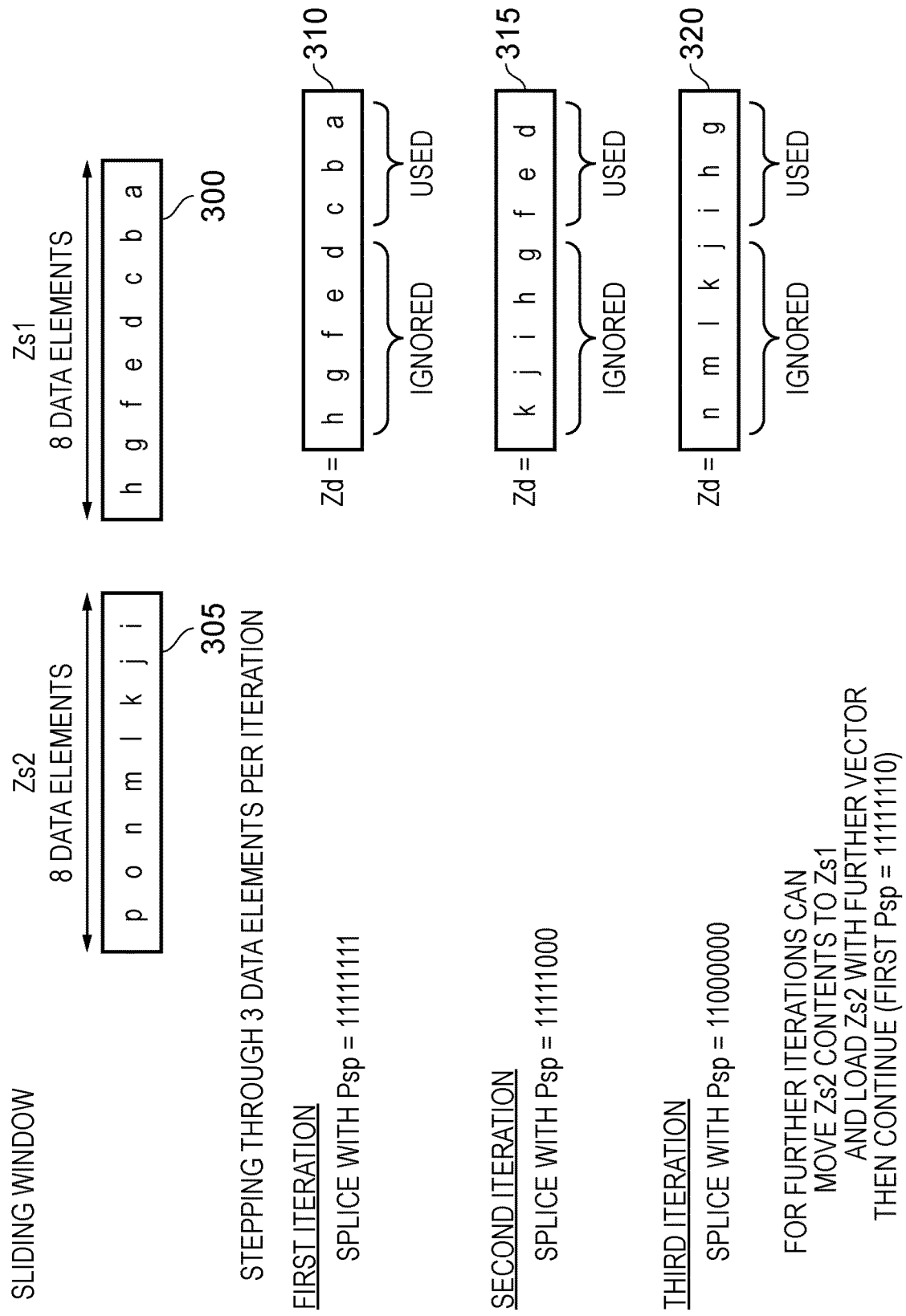
FIG. 8 is a diagram schematically illustrating how a sequence of splice instructions may be executed in order to perform a sliding window operation in accordance with one embodiment.

FIG. 8 illustrates how the above described splice instructions may be used to implement a sliding window operation, in particular by iterative execution of the splice instruction with different predicate data on each iteration. Firstly, two source registers 300, 305 are loaded with source vectors, in this example each source vector comprising eight data elements. It is then assumed in this example that it is desired to extract three data elements at a time from those source registers. During the first iteration the splice instruction is executed with a splice predicate set to all ones, causing the contents of the source register 300 to be stored within the destination register 310. A subsequent operation can then be performed on the three data elements occupying the least significant three data element positions within the register 310, with the remaining data elements being ignored.

During a next iteration, the splice instruction is executed with a predicate of "11111000" causing the destination register 315 to be filled with the data elements shown in FIG. 8. In particular, the least significant three data element positions now contain the data elements "fed", and accordingly those data elements can be subjected to a subsequent operation, with the remaining data elements in the register 315 ignored.

During a third iteration, the splice instruction is executed with a splice predicate of "11000000". This causes only the data elements "g" and "h" to be extracted from the first source register 300, with the remaining data elements in the destination register 320 then being provided from the second source register 305. It is now the case that the lower three data element positions within the destination register 320 contain the data elements "ihg", which can then be operated on in a subsequent operation, with the remaining contents of the register 320 ignored. Accordingly, it can be seen that the use of such splice instructions provides a particularly efficient implementation for performing a sliding window type of operation, in this case the window identifying blocks of three data elements.

After the third iteration shown in FIG. 8, if the sliding window operation needs to continue, it will then be necessary to update the contents of the two source registers 300, 305. In particular, in one example the original contents of the second source register 305 can be moved to the first source register 300, with further vector data then being loaded into the second source register. During the next iteration, the splice instruction can then be executed with a splice predicate of "11111110", thereby causing the least significant three data element positions in the result vector to be occupied by the data elements "lkj".

In the above examples, it has been assumed that the required splice control information for the splice instruction is specified by a single predicate register, as per the example shown in FIG. 9A with reference to the predicate register 350. In the example of FIG. 9A it is assumed that the predicate takes the same form as discussed earlier with reference to FIG. 2. However, in alternative embodiments the splice instruction can specify the required splice control information in a number of different ways. For example, as shown in FIG. 9B it would be possible to specify the required splice control information using the contents of two scalar registers 355, 360. In the example shown in FIG. 9B, each scalar register stores a scalar value, the first scalar register identifying a start data element position and the second scalar register identifying an end data element position. To be consistent with the example of FIG. 9A, the first scalar register identifies the data element position two and the second scalar register identifies the data element position four. It will be appreciated that in an alternative embodiment, the second scalar register may be arranged to specify a length instead of an end position.

In an alternative embodiment as shown in FIG. 9C, a combination of a predicate register and a source register may be used to specify the required splice control information. In the example shown in FIG. 9C, the source register 365 identifies the start data element position, in this example data element position 2. The splice predicate register 370 may then identify the end data element position, in this example four (as shown in FIG. 9C), or alternatively could specify a length, which is this example would be a length of three. Arranging for the predicate register 370 to identify the length, with the scalar register 365 then identifying the start position, could be useful in some embodiments, for example in the sliding window arrangement of FIG. 8. In particular, for each iteration of the splice instruction, it would not be necessary to update the predicate register contents, since in each iteration the length will be three. Instead, the scalar register could merely be updated on each iteration to identify the new starting data element position.

FIG. 9D illustrates a further alternative, where the scalar register 375 defines a length (in this example three), and the predicate 380 identifies a start element position (in this example position two).

When using any of the forms of control registers of FIGS. 9B to 9D, it will be appreciated that the analysis circuitry 240, 270 of FIG. 5 or 7 is no longer performing (or only performing) predicate analysis, but also is analysing any scalar registers providing the required control data.

From the above described embodiments, it will be seen that by arranging the apparatus to execute the described splice instructions, this provides a great deal of flexibility as to how the active data elements are selected within the first vector, since the specified control data identifies the active data elements without reference to the vector length, allowing an arbitrary sequence of active data elements occupying sequential data element positions to be chosen when performing the splice operation. The bounds of the active data elements can be specified without relying on any knowledge of the vector length, and as a result the splice instruction can be used with various different apparatuses, irrespective of whether each apparatus operates on vectors having the same length, or whether some of the apparatuses operate on vectors of a different length to the vectors operated on by certain other of the apparatuses. This hence facilitates the use of such splice instructions in generic library code, since the resultant splice operation can be performed in a vector length agnostic fashion. The described splice instruction is useful in many situations, for example in algorithms employing sliding window operations such as filters, string processing, processing of sparse arrays, etc. It also replaces the need for having vector element rotate/shift instructions explicitly in the instruction set.

FIG. 10 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 415 running a host operating system 410 supporting a virtual machine program 405. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 405 provides an application program interface to an application program 400 which is the same as the application program interface which would be provided by the real hardware which is the device being modelled by the virtual machine program 405. Thus, the program instructions, including the splice instruction described above, may be executed from within the application program 400 using the virtual machine program 405 to model their interaction with the virtual machine hardware.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
a set of vector registers;
one or more control registers; and
processing circuitry to execute a sequence of instructions including a splice instruction identifying at least a first vector register and at least one control register, the first vector register storing a first vector of data elements having a vector length that is dependent on a number of data elements in the first vector and a size of the data elements, and the at least one control register storing control data identifying, independently of the size of the data elements, one or more data elements;
the one or more data elements comprising one of: one data element within the first vector of data elements, or a plurality of data elements occupying sequential data element positions within the first vector of data elements, wherein the control data comprises location data identifying a location of a given data element within the first vector register and length data, different from the location data, identifying a number of data elements, including the given data element, to extract from the first vector of data elements;
the processing circuitry being responsive to execution of the splice instruction to extract from the first vector each data element identified by the control data in the at least one control register and to output each extracted data element within a result vector register of data elements that also contains data elements from a second vector of data elements,
wherein:
the processing circuitry outputs, in response to extracting a single extracted data element from the first vector, irrespective of which value is specified by the location data, the single extracted data element within a data element position at a first end of the result vector register; and
the processing circuitry outputs, in response to extracting a plurality of extracted data elements from the first vector, irrespective of which values are specified by the location data and the length data, each of the plurality of extracted data elements within a plurality of consecutive sequential data element positions of the result vector register starting from the first end of the result vector register, with no intervening data element positions between the plurality of consecutive sequential data element positions;
the splice instruction further identifies a second vector register storing the second vector of data elements, and the processing circuitry is responsive to execution of the splice instruction to include, at each data element position in the result vector register unoccupied by each extracted data element, a data element from the second vector of data elements;

the processing circuitry is arranged to include within the result vector register sequential data elements starting from a first end of the second vector of data elements; and each of the first source vector register, the second source vector register and the result vector register consists of a same number of data elements.

2. An apparatus as claimed claim 1, wherein:

said one or more control registers comprise at least one predicate register, each predicate register used to store predicate data for each data element position within a vector of data elements; and the at least one control register identified in the splice instruction comprises one of said at least one predicate register, the processing circuitry being responsive to execution of the splice instruction to determine from the predicate data each data element to be extracted from the first vector.

3. An apparatus as claimed in claim 2, wherein the predicate data provides the location data and the length data used to determine the one or more data elements to be extracted from the first vector of data elements.

4. An apparatus as claimed in claim 3, wherein the predicate data identifies a first extraction data element position and a last extraction data element position, and the processing circuitry determines, as the data elements to be extracted from the first vector of data elements, a sequence of data elements between the first extraction data element position and the last extraction data element position.

5. An apparatus as claimed in claim 1, wherein:

said one or more control registers comprises one or more scalar registers for storing data values; and the at least one control register identified in the splice instruction comprises at least one scalar register, the processing circuitry being responsive to execution of the splice instruction to use the data value in each of the at least one scalar register when determining each data element to be extracted from the first vector.

6. An apparatus as claimed in claim 5, wherein the splice instruction identifies first and second scalar registers whose stored data values provide the location data and the length data used to determine the one or more data elements to be extracted from the first vector of data elements.

7. An apparatus as claimed in claim 6, wherein the stored data values in the first and second scalar registers identify a first extraction data element position and a last extraction data element position, and the processing circuitry determines, as the data elements to be extracted, a sequence of data elements between the first extraction data element position and the last extraction data element position.

8. An apparatus as claimed in claim 5, wherein:

said one or more control registers comprise at least one predicate register, each predicate register used to store predicate data for each data element position within a vector of data elements; and the at least one control register identified in the splice instruction comprises an identified predicate register of said at least one predicate register and an identified scalar register of the one or more scalar registers, the data value in the identified scalar register being used in combination with the predicate data in the identified predicate register to determine the one or more data elements to be extracted from the first vector of data elements.

9. An apparatus as claimed in claim 1, wherein the first vector register and the second vector register are the same vector register.

10. An apparatus as claimed in claim 1, wherein the first vector register is a predicate register used to store predicate data for each data element position within a vector of data elements.

11. An apparatus as claimed in claim 10, wherein each data element within the first vector register comprises a single bit.

12. An apparatus as claimed in claim 1, wherein the processing circuitry is arranged to execute the splice instruction in each of a plurality of iterations, and, in each iteration, control data in the at least one control register identified by the splice instruction identifies one or more data elements to be extracted from the first vector of data elements that differ from the one or more data elements identified for extraction during a preceding iteration.

13. An apparatus as claimed in claim 1, wherein the processing circuitry comprises vector permute circuitry.

14. An apparatus as claimed in claim 13, wherein the processing circuitry is responsive to execution of the splice instruction to include, at each data element position in the result vector register unoccupied by each extracted data element, a data element from the second vector of data elements, and, wherein the vector permute circuitry comprises:

first shift circuitry to perform a first shift operation on the first vector of data elements and second shift circuitry to perform a second shift operation on the second vector of data elements;

combination circuitry to generate a result vector to be stored in the result vector register from the vectors output by the first and second shift circuitry; and analysis circuitry to analyse the control data in the at least one control register in order to determine said one or more data elements to be extracted from the first vector of data elements, and to issue control signals to control the operation of the first and second shift circuitry in dependence on said analysis.

15. An apparatus as claimed in claim 14, wherein the vector permute circuitry further comprises:

first mask circuitry to perform a first mask operation on the vector output by the first shift circuitry in order to produce a first masked vector, and second mask circuitry to perform a second mask operation on the vector output by the second shift circuitry in order to produce a second masked vector;

the combination circuitry being arranged to generate the result vector by combining the first and second masked vectors.

16. An apparatus as claimed in claim 13, wherein the processing circuitry is responsive to execution of the splice instruction to include, at each data element position in the result vector register unoccupied by each extracted data element, a data element from the second vector of data elements, and, wherein the vector permute circuitry comprises:

programmable crossbar circuitry to generate a result vector to be stored in the result vector register from the first vector of data elements and the second vector of data elements; and analysis circuitry to analyse the at least one control register in order to determine said one or more data elements to be extracted from the first vector of data elements, and to issue control signals to control the operation of the programmable crossbar circuitry in dependence on said analysis.

17. An apparatus as claimed in claim 1, wherein:
the first vector of data elements has a first end of the first vector of data elements corresponding to the first end of the second vector of data elements and a second end of the first vector of data elements at an opposite end to the first end of the first vector of data elements; and
the processing circuitry is responsive to the control data identifying the one or more data elements as excluding at least one data element at the second end of the first vector of data elements, to include, at each data element position in the result vector register unoccupied by the one or more data elements, the sequential data elements extracted from the first end of the second vector of data elements.

18. A computer program stored on a non-transitory computer readable storage medium that, when executed by a data processing apparatus, provides a virtual machine which provides an instruction execution environment corresponding to the apparatus of claim 1.

19. A method of performing a splice operation within an apparatus having a set of vector registers, and one or more control registers, the method comprising:
executing a splice instruction identifying at least a first vector register and at least one control register, the first vector register storing a first vector of data elements having a vector length that is dependent on a number of the data elements in the first vector and a size of the data elements, and the at least one control register storing control data identifying, independently of the size of the data elements, one or more data elements;
the one or more data elements comprising one data element, or a plurality of data elements, occupying sequential data element positions within the first vector of data elements, wherein the control data comprises location data identifying the location of a given data element within the first vector register and length data, different from the location data, identifying a number of data elements, including the given data element, to extract from the first vector of data elements;
said executing the splice instruction comprising:
extracting from the first vector each data element identified by the control data in the at least one control register; and
outputting each extracted data element within a result vector register of data elements that also contains data elements from a second vector of data elements,
wherein:
the method comprises outputting, in response to extracting a single extracted data element from the first vector, irrespective of which value is specified by the location data, the single extracted data element within a data element position of the result vector register at a first end of the result vector register,
the method comprises outputting, in response to extracting a plurality of extracted data elements from the first vector, irrespective of which values are specified by the location data and the length data, each of the plurality of extracted data elements within a plurality of consecutive sequential data element positions of the result vector register starting from the first end of the result vector register, with no intervening data element positions between the plurality of consecutive sequential data element positions,
the splice instruction further identifies a second vector register storing the second vector of data elements, and said executing the splice instruction includes, at each data element position in the result vector register unoccupied by each extracted data element, a data element from the second vector of data elements;
said executing the splice instruction includes within the result vector register sequential data elements starting from a first end of the second vector of data elements; and
each of the first source vector register, the second source vector register and the result vector register consists of a same number of data elements.

20. An apparatus, comprising:
a set of vector register means;
one or more control register means; and
processing means for executing a sequence of instructions including a splice instruction identifying at least a first vector register means and at least one control register means, the first vector register means for storing a first vector of data elements having a vector length that is dependent on a number of data elements in the first vector and a size of the data elements, and the at least one control register means for storing control data identifying, independently of the size of the data elements, one or more data elements;
the one or more data elements comprising one of: one data element within the first vector of data elements, or a plurality of data elements occupying sequential data element positions within the first vector of data elements, wherein the control data comprises location data identifying the location of a given data element within the first vector register and length data, different from the location data, identifying a number of data elements, including the given data element, to extract from the first vector of data elements;
the processing means, responsive to execution of the splice instruction, for extracting from the first vector each data element identified by the control data in the at least one control register means, and for outputting each extracted data element within a result vector register of data elements that also contains data elements from a second vector of data elements,
wherein:
the processing means outputs, in response to extracting a single extracted data element from the first vector, irrespective of which value is specified by the location data, the single extracted data element within a data element position at a first end of the result vector register; and
the processing means outputs, in response to extracting a plurality of extracted data elements from the first vector, irrespective of which values are specified by the location data and the length data, each of the plurality of extracted data elements within a plurality of consecutive sequential data element positions of the result vector register starting from the first end of the result vector register, with no intervening data element positions between the plurality of consecutive sequential data element positions;
the splice instruction further identifies a second vector register storing the second vector of data elements, and the processing means is responsive to execution of the splice instruction to include, at each data element position in the result vector register unoccupied by each extracted data element, a data element from the second vector of data elements;

the processing means is arranged to include within the result vector register sequential data elements starting from a first end of the second vector of data elements; and each of the first source vector register, the second source vector register and the result vector register consists of a same number of data elements.

* * * * *